United States Patent [19]

Becker

[11] 3,790,940

[45] Feb. 5, 1974

[54] COMMUNICATION APPARATUS HAVING A RANGING CAPABILITY

[75] Inventor: Harold D. Becker, Buffalo, N.Y.

[73] Assignee: Cornell Aeronautical Laboratory, Inc., Buffalo, N.Y.

[22] Filed: Oct. 12, 1971

[21] Appl. No.: 188,046

[52] U.S. Cl. .......... 343/12 R
[51] Int. Cl. .......... G01s 9/38
[58] Field of Search .......... 343/12 R

[56] References Cited

UNITED STATES PATENTS

| | | | |
|---|---|---|---|
| 2,248,727 | 7/1941 | Strobel | 343/12 R |
| 3,264,644 | 8/1966 | Jacob | 343/12 R |
| 3,242,487 | 3/1966 | Hammack | 343/12 R X |
| 3,641,573 | 2/1972 | Albranese | 343/12 R |
| 3,438,032 | 4/1969 | Cook | 343/12 R |

*Primary Examiner*—Malcolm F. Hubler
*Attorney, Agent, or Firm*—Allen J. Jaffe

[57] ABSTRACT

A communication apparatus having a ranging capability wherein the phase of a ranging tone is locked to the phase of the modulation on a transmitted radio frequency signal by a null sensing servo which shifts the phase of the ranging tone until the energy at the carrier frequency of the output of a product detector is brought to zero, the inputs to which comprise the radio frequency signal and the ranging tone.

13 Claims, 3 Drawing Figures

PATENTED FEB 5 1974 3,790,940

SHEET 1 OF 2

INVENTOR

HAROLD D. BECKER

BY [signature]

ATTORNEY

INVENTOR
HAROLD D. BECKER.

BY [signature]
ATTORNEY

COMMUNICATION APPARATUS HAVING A RANGING CAPABILITY

BACKGROUND OF THE INVENTION

The present invention relates to radio communication equipment and, more particularly, to such equipment having distance or range measuring capabilities.

Prior attempts to measure or determine the range between voice communication systems have not been successful. The primary reason for the failures of the prior art is the inability to achieve an accurate measure of the phase shift caused by the propagation distance between the transmitter and receiver, due to the phase instabilities in the transmitter or receiver components.

In distance measuring systems designed for highly accurate range measuring, a relatively high modulation frequency must be chosen to achieve desirable accuracy and resolution, since the range error introduced by a given signal to noise ratio as well as the range error due to a given phase error (caused by equipment instabilities) are inversely proportional to the modulation frequency. High accuracy systems based on this principle have been developed with reasonable success. These systems are generally of wide bandwidth; however, they are still limited in performance by the seemingly irreducible phase instabilities in the transmitter and receiver components.

Heretofore, no successful technique has been devised whereby a continuous wave distance measuring equipment (CW DME) capability can be incorporated in narrow band communication systems. Since the common forms of VHF and UHF communication equipments are designed primarily for voice communication applications, the attainable distance measuring performance is severely limited. The most obvious limitation is the narrow bandwidth of both the transmitted RF signal and the modulation which can be employed. Moreover, since voice communications are generally insensitive to phase distortions of the audio signal, it cannot be expected that such equipment would have good phase repeatability between various equipments or good phase stability with changes in tuning, signal level, temperature and the like. In fact, the phase instabilities encountered with conventional communications equipment make it impossible to incorporate known range measuring techniques. For example, in a DME system in which a 2.081 kHz ranging tone is employed, a range error of 200 meters will be incurred for every degree of uncompensated phase error in the equipment. Thus, the total equipment stability among the two transmitters and the two receivers in the system must be good to ½° if the range error is to be held under 100 meters; yet the modulation phase delay alone through each receiver is of the order of many tens of degrees up to a few hundred degrees.

SUMMARY OF THE INVENTION

The foregoing disadvantages, as well as others, of the prior art are overcome according to the teachings of the present invention which provides a radio communication system having a distance measuring capability, the operative structure of which requires a minimum of modification to existing communications equipment.

The phase of the modulation on a carrier signal is shifted in direct proportion to the length of the radio path over which the signal propagates. The above mentioned phase instabilities inherent in the transmitting and receiving components prevents an accurate measure of this phase shift by known techniques. The present invention is based on the realization that when the energy at the carrier frequency of a signal, which is the product of a received modulated radio frequency signal and a second signal at the modulating frequency, is reduced to zero the modulation on the received signal is in phase quadrature with the second signal. Thus, the phase of the second signal provides an accurate basis for determining the phase shift of the received signal due to propagation distance only, independent of phase instabilities in the equipment. The manner in which the range is determined depends upon the type of system employed. For example in a one-way system utilizing extremely accurate clocks, such as atomic clocks, it is only necessary to compare the phase of the second signal with the phase of the clock to determine the propagation distance of the received signal. In a two-way system the second signal is transmitted back to the source and a range determination is made thereat.

Basically, then, the present invention provides a communication system having a distance measuring capability which is not compromised by the phase instabilities of the equipment, comprising; means for developing an output signal which is proportional to the product of first and second input signals; the first input signal comprising a received modulated radio frequency signal; detection means responsive to the output signal for developing as an output a signal which is proportional to the energy in said output signal at the carrier frequency; the second input signal comprising a signal at the modulating frequency, and means responsive to the output of the detection means for varying the phase of the second input such that the output of the detection means is reduced to substantially zero whereby the second input signal is brought into phase quadrature with the modulation of the first input signal.

BRIEF DESCRIPTION OF THE DRAWINGS

For a fuller understanding of the invention, reference should now be had to the following detailed description of the same taken in conjunction with the accompanying drawings, wherein.

DESCRIPTION OF THE PREFERRED EMBODIMENTS

Figure 1:
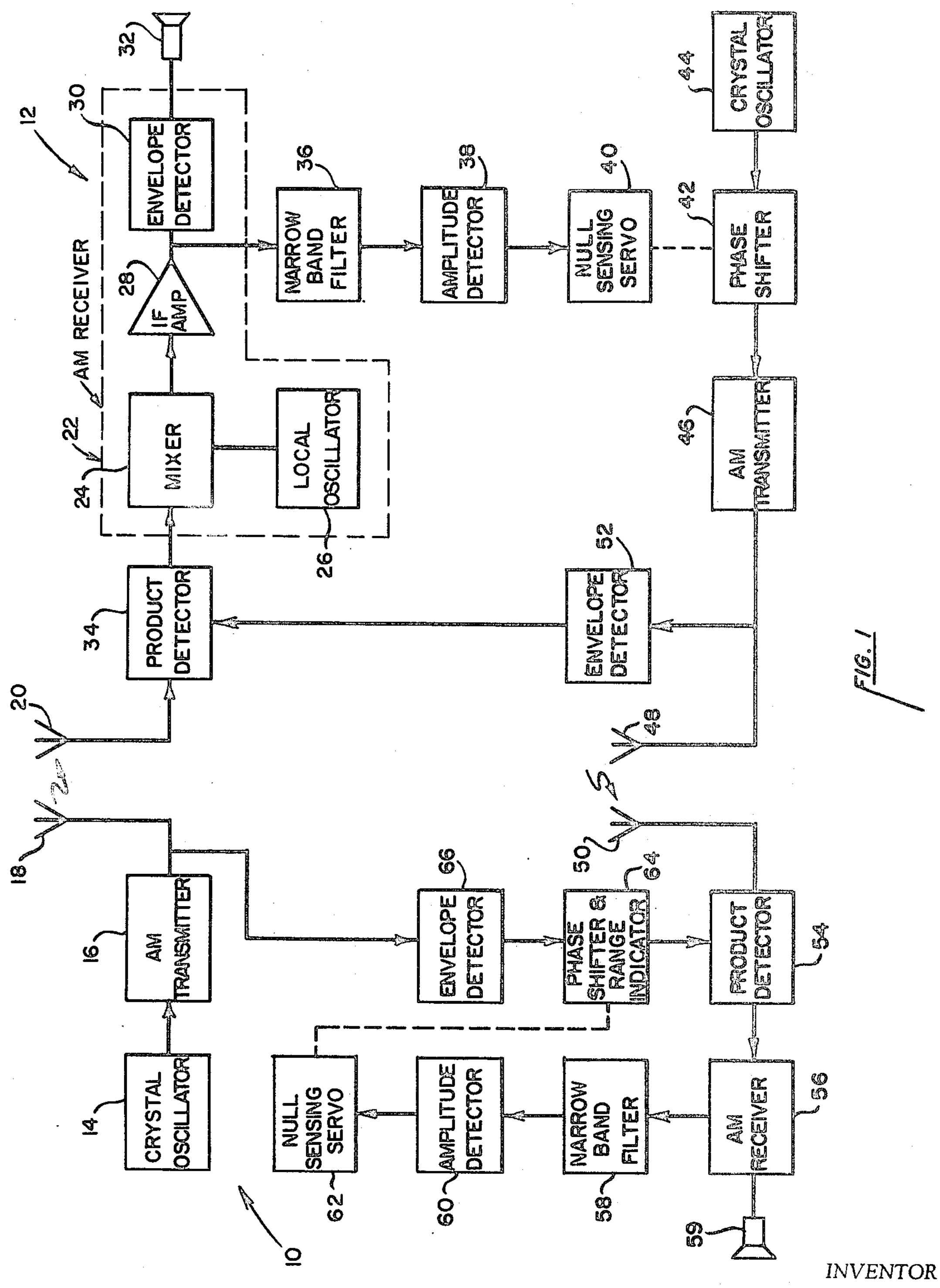
FIG. 1 is a schematic in block form of the system according to the invention.

Referring now to the drawings and, more particularly, to FIG. 1, the communications system is depicted as comprising an interrogator, depicted generally at 10, and a transponder, depicted generally at 12.

The interrogator 10 comprises a first range tone signal generating means such as a crystal oscillator 14, a conventional transmitter 16, which may be AM, for example, although other types can be employed as will become apparent hereinbelow. A suitable antenna 18 is provided for radiating the signal toward the receiving antenna 20 of the transponder 12.

The transponder 12 comprises a conventional receiver 22, including a mixer 24, a local oscillator 26, an intermediate frequency amplifier 28 and an envelope detector 30 which, in normal operation as communication system, produces the demodulated output which drives a suitable sound reproducer 32 or the like.

According to the present invention a conventional multiplier or product detector 34 is inserted between the receiving antenna 20 and the receiver 22 or, more specifically the mixer 24 thereof. There is additionally provided a narrow band filter 36 communicating with the output of the receiver's intermediate frequency amplifier 28, which filter communicates with an amplitude detector 38. A null sensing servo 40, to be described in greater detail hereinbelow, responds to the output signal from detector 38 for controlling or driving a phase shifter 42 if the detector output is not at zero or a minimum, as will be discussed later.

A suitable second ranging tone signal source at the modulating frequency of the received signal is fed into phase shifter 42. Such a source may comprise a crystal oscillator 44; alternatively, the signal may be derived from the output of envelope detector 30. The signal emanating from phase shifter 42 modulates transmitter 46 and is transmitted via antenna 48 to the receiving antenna 50 of interrogator 10. The output of transmitter 46 is also fed into an envelope detector 52, the output of which is fed as a second input to product detector 34.

At the interrogator the received signal from antenna 50 is fed as a first input to a product detector 54, the output from which is fed into a receiver 56, similar to receiver 22 of the transponder 12. The intermediate frequency output of receiver 56 is delivered to a narrow band filter 58, the output from which is fed into an amplitude detector 60. The output of receiver 56 is fed to a suitable sound reproducer 59.

A null sensing servo 62, similar to 40, responds to the signal from detector 60 for controlling the actuation of a phase shifter 64 which controls the phase of the range tone signal obtained from transmitter 16 through an envelope detector 66. The output of the phase shifter 64 is fed as a second input to product detector 54.

The operation and theory of the FIG. 1 embodiment will now be discussed. Assuming transmitter 16, normally employed for voice communication, is amplitude modulated by a sinusoidal ranging tone at a frequency of $\omega_m$ radians per second from oscillator 14, the radiated $e_t$ signal may be expressed as:

$$e_t = E_c\ (1 + m \sin \omega_m\ t) \cos \omega_c\ t \qquad (1)$$

Where $E_c$ is the carrier amplitude $\omega_c$ is the carrier frequency in radians per second $\omega_m$ is the modulation frequency in radians per second and $M$ is the modulation factor.

The transmitted signal is delayed by $T=R/c$ seconds in propagating over a distance, $R$, between transmitter 16 and transponder 12, where $c$ is the speed of light. Thus, the radio frequency carrier experiences a phase shift of $\phi = \omega_c\ T$ radians while the modulation phase is delayed by $\theta = \omega_m\ T$ radians. The received signal may be expressed as:

$$e_r = k\ E_c\ [1 + m \sin (\omega_m\ t + \theta)] \cos (\omega_c\ t + \phi) \qquad (2)$$

where $k$ is the propagation attenuation factor $\theta$ is the phase shift of the modulation due to the propagation delay, in radians $\phi$ is the phase shift of the radio frequency carrier due to the propagation delay, in radians.

This received signal is applied as one input to product detector 34. The other input to the product detector is a sinusoidal signal, at the modulating frequency of the received signal, which is derived from oscillator 44 and fed via phase shifter 42, transmitter 46 and envelope detector 52 to product detector 34. Assuming the phase of this signal to be $\alpha$, then the output of the product detector, $y(t)$, may be expressed as:

$$y(t) = e_r \cos(\omega_m\ t + \alpha) \text{ or} \qquad (3)$$

$$t\ (t) = (k/2)\ E_c\ \{ \cos\ [(\omega_c + \omega_m)t + \alpha + \phi] + cos[(-\omega_c - \omega_m)t + \phi - \alpha\ ] + m/2 \sin[(\omega_c + 2\omega_m)t + \phi + \theta + \alpha\ ] - m/2 \sin[(\omega_c - 2\omega_m) + \phi - \theta - \alpha] + m/2 \sin\ (\theta - \alpha) \cdot \cos(\omega_c t + \phi)\} \qquad (4)$$

The signal at the output of the product detector is, thus, composed of two side-frequency components at $\omega_c \pm \omega_m$, a second pair at $\omega_c \pm 2\ \omega_m$ and a carrier frequency term, $m/2 \sin (\theta - \alpha)\cos(\omega_c t + \phi)$. When $\theta$ equals $\alpha$, this carrier frequency term is reduced to zero. Thus the phase of the modulation on the signal from transmitter 46 is locked with the phase of the modulation on the received signal at antenna 20 when the energy from detector 34 at the carrier frequency is zero; in fact, they are in phase quadrature. Once such phase relationship is established, the phase of the return signal to interrogator 10 will be uninfluenced by phase instabilities within the components of transponder 12. To achieve this relationship, means are provided which sense the energy in the output of the product detector at the carrier frequency and control the phase of the second input to the product detector such that the energy is reduced to zero.

Such means may conveniently comprise the narrow band filter 36 which passes only the signal at the carrier frequency from the intermediate frequency amplifier 28 of receiver 22 which, of course, is derived from the output of product detector. This signal is delivered to amplitude detector 38, the output of which is responsive to the magnitude of such signal. Null sensing servo 40 responds to the magnitude of this signal and functions to drive phase shifter 42 in the appropriate direction which causes a change in phase in the second input to product detector sufficient to bring the output of amplitude detector 38 back to substantially zero. When such a condition is established the above mentioned phase relationship is established. Any suitable, well known structure for sensing the energy at the carrier frequency and changing the phase of the second input to the product detector may be employed, such as that depicted in FIG. 2.

Figures 2, 3:
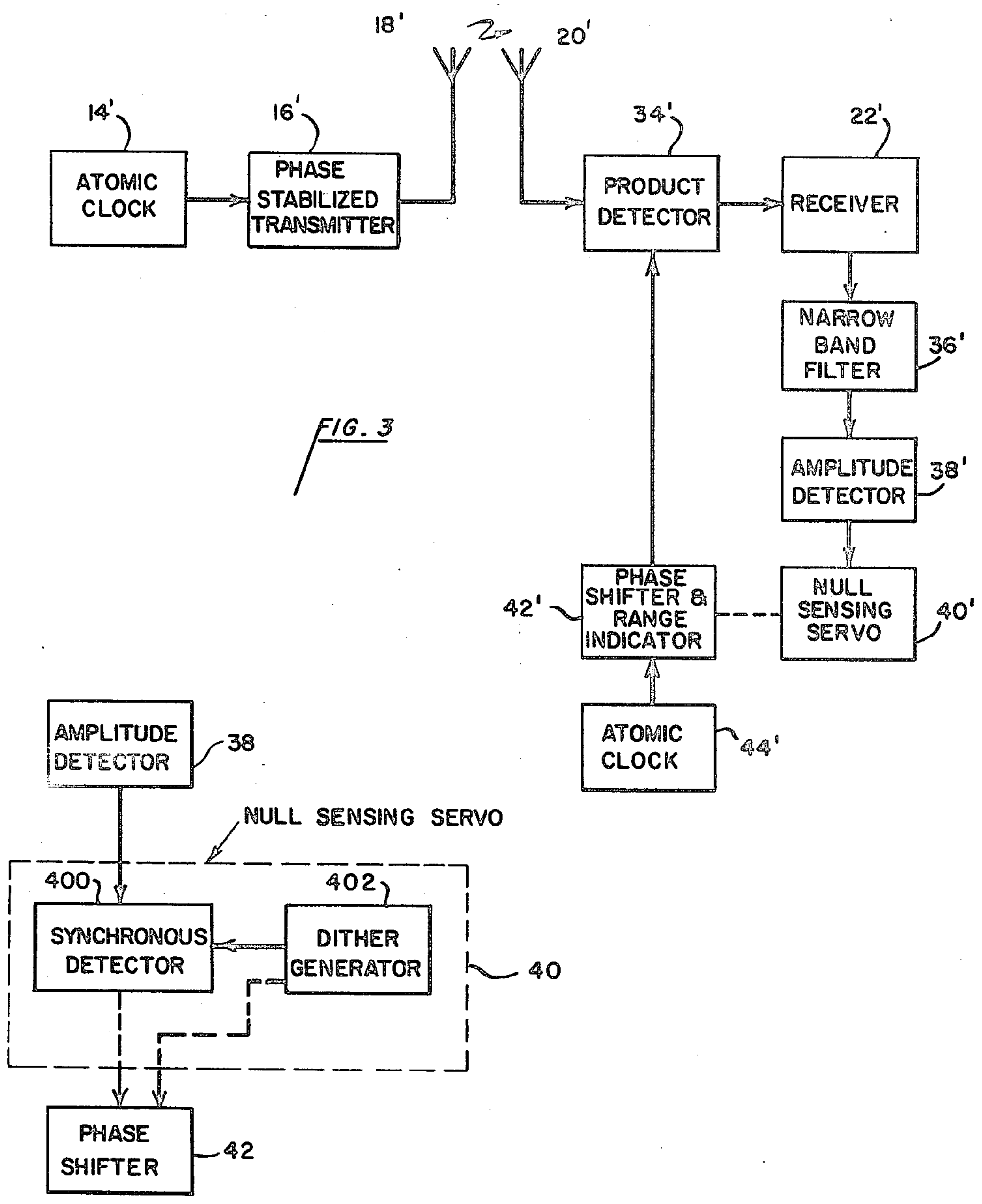
FIG. 2 is a detailed schematic representation of a portion of the system illustrated in FIG. 1.
FIG. 3 is a schematic representation of a slightly modified form of the invention.

In FIG. 2 the null sensing servo is depicted as comprising a synchronous detector 400 and a dither generator 402. These elements are conventional and readily available, therefore no further detailed description thereof is deemed necessary. The signal level at the output of amplitude detector 38 is a function of the energy at the carrier frequency in the output of the product detector. This signal is reduced to substantially zero when $\alpha$ is made equal in value to $\theta$ (see equation (4)). The dither generator 402 produces an output, such as a square wave, which is applied to the synchronous detector 400 and to the phase shifter 42 creating a small square wave variation of the phase shifter position which causes a small perturbation or dither on the value of $\alpha$. This creates a perturbation in the output of the amplitude detector 38 which is either in phase or out of phase with the dither signal input to the synchronous detector, depending whether the average value of $\alpha$ is less than or greater than $\theta$. The output of the synchronous detector 400 will be either positive or negative depending on whether $\alpha$ is less or greater than $\theta$, which output is used to position phase shifter 42 to maintain $\alpha$ equal in value to $\theta$.

With the magnitude of $\alpha$ equal to $\theta$, the phase of the second ranging tone which is the modulation on a second carrier radio frequency signal emanating from transmitter 46 is locked to (actually, in phase quadrature with) the phase of the modulation on the radio frequency signal received at antenna 20. This second modulated radio frequency signal is radiated by antenna 48 to the antenna 50 at the interrogator 10, and experiences an additional phase shift due to the propagation distance between the interrogator 10 and the transponder 12. The difference in phase between the first ranging tone and the modulation on this second radio frequency signal received at interrogator 10 is a function of the round trip distance traveled by the first and second radio frequency signals. However due to the phase instabilities of the receiver components at the interrogator it is not possible to measure the actual propagation-caused phase difference by observing the phase of the normal demodulated receiver output signal. According to the present invention means are provided at the interrogator 10 to lock the phase of the first ranging tone with that of the modulation on the second modulated radio frequency signal received at 50 such that the true propagation distance can be determined. The structure for accomplishing this is similar to that previously described at the transponder 12.

Thus, the second range tone modulated signal is fed into one input of product detector 54 with the other range tone input thereto derived from the output of the envelope detector 66 which forms the reference phase to be used in the distance determination. The energy at the carrier frequency of the output of detector 54 is sensed by narrow band filter 58 and amplitude detector 60. If this energy deviates substantially from zero null sensing servo 62 causes phase shifter 64 to change the phase of the first ranging tone reference signal from transmitter 16 and envelope detector 66 by an amount necessary to bring this energy to zero. This degree of phase shift is a measure of the range and a suitable indicator can be incorporated with the phase shifter to provide a visual or other indication thereof.

Although the foregoing has described a communication system with a range measuring capability wherein the ranging tone or signal travels from the interrogator to the transponder and back, with the range being determined at the interrogator, it is possible to adapt this technique to a one-way system in which the range is measured at a terminal containing only a receiver if very stable clocks or signal generators are incorporated. Thus, the embodiment in FIG. 3 incorporates extremely stable and synchronized signal generators such as atomic clocks 14' and 44'. In this embodiment parts similar to parts of the FIG. 1 embodiment are depicted by similar numerals which are primed. The atomic clock 14' generates a ranging tone signal which modulates a radio frequency carrier signal in phase stabilized transmitter 16'. This modulated signal is radiating by antenna 18' to antenna 20' where it is fed as a first input to product detector 34', the second input to which is derived from atomic clock 44'. As previously described the energy in the output of product detector 34' at the carrier frequency is sensed by narrow band filter 36' and amplitude detector 38' which actuates null sensing servo 40' to change the phase of the signal from clock 44' by shifter 42' such that the energy at the carrier frequency is brought to zero. At this condition the phase of the ranging tone from shifter 42' is in quadrature with the phase of the modulation on the first input signal to detector 34'. Since the phase of the modulation on this signal has been shifted from antenna 18' by the propagation distance to antenna 20' and since the signal emanating from clock 44' is synchronized with that emanating from clock 14', the amount of phase shift introduced by shifter 42' to bring about the zero energy-phase quadrature relationship is a direct function of the propagation distance. A suitable indicator can be incorporated in shifter 42' to determine the amount of phase shift and, hence, the range.

In summary, it can be seen that the product detectors 34, 34' and 54 perform, in effect, a frequency translation. The radio frequency input to each product detector consists of a carrier which is modulated by a ranging tone, the frequency spectrum at this input thus consists of one spectral line at the carrier frequency, $\omega_c$ , and two components at $\pm\omega_m$ from the carrier. The second input to the detector is a tone at $\omega_m$ radians per second. The product detector creates an output which is represented by the translation or shift in frequency of each of the radio frequency components by an amount equal to plus and minus $\omega_m$ . That is, the energy of the received carrier (at the frequency $\omega_c$ ) is translated to two new components at $\omega_c\pm\omega_m$ . Each of the original sidebands (which were at $\omega_c\pm\omega_m$ ) are now translated to $(\omega_c\pm\omega_m)\pm\omega_m$ , resulting in energy at $\omega_c$ and at $\omega_c\pm2\omega_m$ . Thus, the energy existing at the frequency $\omega_c$ at the output of the product detector is derived from the product of the original side-band components and the range tone at $\omega_m$ , which is the other input to the product detector. The original carrier term has been shifted away from the carrier frequency $\omega_c$ and is ignored. The present apparatus, therefore, functions in the same manner whether or not the transmitted carrier term is present. Thus suppressed carrier systems could readily utilize the teachings of the present invention. As explained previously, the energy which exists at the output of the product detector at the carrier frequency is reduced to zero when the phase of the range tone input to the product detector is in quadrature with the phase of the modulation on the received radio frequency signal. The phase of the range tone input to the product detector will remain locked in phase with the phase of the modulation on the received signal and therefore tracks the phase shift created by the path length over which the signal propagates.

The foregoing description has emphasized the range determining function of the disclosed system. Of course, for normal communications, the range determining circuitry would be switched out of the communication circuit.

Although by way of illustration and not limitation the present invention has been described as applicable to various types of amplitude modulated systems, it can be applied to frequency modulated systems as well. In FM applications, the envelope detectors would be replaced with FM discriminators, the transmitters would be phase stable FM transmitters and the receivers would be FM receivers.

Although preferred embodiments have been disclosed and described, changes will occur to those skilled in the art. It is therefore intended that the invention is to be limited only by the scope of the appended claims.

I claim:

1. A Communication and ranging apparatus, comprising:

A. first means for developing an output signal which is proportional to the product of first and second input signals, B. said first input signal comprising a modulated radio frequency signal, C. detection means responsive to said output signal for developing as an output a signal which is proportional to the energy of said output signal at the carrier frequency of said modulated radio frequency signal, D. said second input signal comprising a signal at the modulating frequency of said radio frequency signal, and E. means responsive to the output of said detection means for varying the phase of said second input such that the output of said detection means is reduced to substantially zero whereby said second input signal is locked in phase with the phase of the modulation on said first input signal.

2. The apparatus according to claim 1, further comprising;

F. means for transmitting said second input signal to the source of said modulated radio frequency signal, G. second means at the source of said modulated radio frequency signal for developing an output signal which is proportional to the product of said second input signal and a signal derived from the modulation on said modulated radio frequency signal, H. second detection means at said source responsive to the output of said second means for developing as an output a signal which is proportional to the energy of the output of said second means at the carrier frequency of said modulated radio frequency signal, and I. means responsive to the output of said second detection means for varying the phase of said signal derived from said modulated radio frequency signal such that the output of said second detection means is reduced to substantially zero whereby the degree of phase variation required is a function of the two-way propagation distance of said modulated radio frequency signal.

3. The apparatus according to claim 1 wherein said first input signal is an amplitude modulated signal.

4. The apparatus according to claim 1 wherein said first input signal is a frequency modulated signal.

5. The apparatus according to claim 1, further comprising;

F. means for transmitting said modulated radio frequency signal to said first means, said means including a phase stable signal generator, and G. means for generating said second input signal which means is in phase synchronization with said phase stable signal generator whereby the degree of phase variation of said second input by said means responsive to the output of said detection means is a function of the propagation distance of said modulated radio frequency signal.

6. A communication apparatus having a distance measuring capability, comprising;

A. first means for transmitting a carrier radio frequency signal modulated by a first ranging tone, B. first receiver means responsive to said radio frequency signal, including means for generating a second ranging tone at the modulation frequency of said first ranging tone, and C. a product detector at said first receiver means developing an output which is the product of said radio frequency signal and said second ranging tone.

7. The apparatus according to claim 6, further comprising;

D. means sensing the energy in said output at the carrier frequency of said radio frequency signal, and E. control means responsive to said energy for changing the phase of said second ranging tone until said energy is reduced to substantially zero, whereby the phase of said second ranging tone is locked with the phase of the modulation on said modulated radio frequency signal.

8. The apparatus according to claim 7, wherein said means sensing the energy comprises a narrow band filter and an amplitude detector.

9. The apparatus according to claim 8, wherein said control means comprises a synchronous detector responsive to the output of said amplitude detector, a phase shifter and a dither generator in operative association with said synchronous detector and said phase shifter.

10. The apparatus according to claim 6, further comprising

D. second means for transmitting a second carrier radio frequency signal modulated by said second ranging tone to second receiver means at said first means, and E. a product detector at said second receiver means developing an output which is the product of said radio frequency signal and said second ranging tone.

11. The apparatus according to claim 10, further comprising at each of said first and second receiver means;

F. means sensing the energy in said output at the carrier frequency of said radio frequency signal, and G. control means responsive to said energy for changing the phase of said second ranging tone until said energy is reduced to substantially zero, whereby the phase of said second ranging tone is locked with the phase of the modulation on said modulated radio frequency signal.

12. The apparatus according to claim 11, wherein said means sensing the energy comprises a narrow band filter and an amplitude detector.

13. The apparatus according to claim 12, wherein said control means comprises a synchronous detector responsive to the output of said amplitude detector, a phase shifter and a dither generator in operative association with said synchronous detector and said phase shifter.

* * * * *